(12) United States Patent
Meixner et al.

(10) Patent No.: US 6,306,504 B1
(45) Date of Patent: Oct. 23, 2001

(54) POLYCARBONATE MOLDED ARTICLES COATED WITH UV-CURABLE COMPOSITIONS

(75) Inventors: Jürgen Meixner, Krefeld; Wolfgang Fischer, Meerbusch; Josef Pedain, Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/770,034

(22) Filed: Jan. 25, 2001

Related U.S. Application Data

(62) Division of application No. 08/383,328, filed on Feb. 3, 1995, now Pat. No. 6,232,360.

(30) Foreign Application Priority Data

Feb. 14, 1994 (DE) .................................... 44 04 616

(51) Int. Cl.⁷ .................................... B32B 27/36
(52) U.S. Cl. ............................................. 428/412
(58) Field of Search ............................... 428/412

(56) References Cited

U.S. PATENT DOCUMENTS

| | | | |
|---|---|---|---|
| 3,968,305 | 7/1976 | Oshima et al. | 428/334 |
| 4,198,465 | 4/1980 | Moore et al. | 428/409 |
| 4,485,226 | 11/1984 | Noll et al. | 528/45 |
| 4,666,779 | 5/1987 | Curry | 428/412 |
| 4,902,724 | 2/1990 | Moore | 522/40 |
| 4,902,725 | 2/1990 | Moore | 522/42 |
| 6,069,227 | * 5/2000 | Podszun | 528/272 |

FOREIGN PATENT DOCUMENTS

| | | |
|---|---|---|
| 3819627 | 12/1989 | (DE) . |
| 4021109 | 1/1992 | (DE) . |
| 2082606 | 3/1982 | (GB) . |
| 80/00942 | 5/1980 | (WO) . |

* cited by examiner

*Primary Examiner*—Christopher Henderson
(74) *Attorney, Agent, or Firm*—Joseph C. Gil; Thomas W. Roy

(57) ABSTRACT

UV-curable coating compositions containing urethane acrylates prepared from hydroxyalkyl acrylates and low-viscosity polyisocyanates having isocyanurate groups, low-viscosity acrylic ester components as reactive diluents, initiators, and optionally solvents and/or other known additives, and their use for coating molded articles of thermoplastic polycarbonates.

4 Claims, No Drawings

POLYCARBONATE MOLDED ARTICLES COATED WITH UV-CURABLE COMPOSITIONS

This is a divisional application of ser. No. 08/383,328, filed Feb. 3, 1995 now U.S. Pat. No. 6,232,360.

BACKGROUND OF THE INVENTION

1. Field of the Invention

The present invention relates to the use of special UV-curable coating compositions based on urethane-modified acrylate resins for coating molded articles of thermoplastic polycarbonates.

2. Description of the Prior Art

Polycarbonate molded articles are used in a variety of ways because of their excellent properties, such as transparency, impact or shock resistance and tensile strength. However, the properties of the surface of the material, such as its low abrasion and scratch resistance and the low resistance to solvents, are inadequate for many areas of application.

In the past, very different solutions have been proposed for the removal of this drawback (cf e.g. PCT Applications WO 80/00968 and 86/04592, U.S. Pat. No. 3,968,305, EP-A 0,274,595 and EP-A 0,274,596). These publications are primarily directed to the coating of molded articles with UV-curing lacquer systems. The processes of these prior publications, however, have a number of serious disadvantages. In particular, the adhesion of the lacquers or the scratch resistance obtained with the lacquers, as the case may be, is not completely satisfactory. The coating compositions of the two last-mentioned prior publications cure only under nitrogen as a deactivating medium.

The coating compositions based on polyacrylate resins having urethane groups according to EP-A 0,020,344 or according to PCT-Application WO 80/100942 also lead to coatings that still do not fully satisfy the practical requirements with regard to scratch resistance and stability to weathering.

The coating compositions according to DE-OS 3,134,157 contain fairly large amounts of N-vinyl derivatives of linear or cyclic amides. A disadvantage of these compositions is the need to carry out the UV irradiation several times in order to obtain good scratch resistance. Furthermore, a low viscosity can be obtained in this case only by using large amounts of N-vinyl pyrrolidone. However, this reduces the resistance to scratching and to solvents as well as the stability to weathering. In addition, if fairly large amounts of N-vinyl pyrrolidone are used, the risk exists of the partial solution, whitening and stress cracking of the polycarbonate, as long as the coating is not yet cured. N-vinyl-pyrrolidone is also undesirable with regard to job hygiene.

The urethane acrylates according to DE-OS 3,819,627 also are used in combination with N-vinyl compounds, which leads to the disadvantageous consequences already mentioned.

The urethane acrylates according to DE-OS 4,021,109 are used in combination with tri- to hexafunctional (meth) acrylates as reactive diluents in order to avoid the said disadvantages of the aforementioned solvents. However, the stability to weathering of the resulting lacquer films is insufficient. This becomes recognizable as a loss of adhesion even after a relatively short time.

Finally, DE-OS 3,318,147 is concerned with special urethane acrylates without any connection to the special problem of coating polycarbonate molded articles.

It is an object of the present invention to provide coating compositions for coating thermoplastic polycarbonates which do not suffer from the disadvantages of the coating compositions of the prior art.

This object may be achieved with the coating compositions of the present invention which are described in more detail below. The coating compositions to be used according to the invention differ, e.g. from the coating compositions according to DE-OS 4,021,109 by the use of a selected low-viscosity polyisocyanate component having isocyanurate groups for the manufacture of the urethane acrylates as well as by the use of mainly linear bis-acrylates as reactive diluent B).

SUMMARY OF THE INVENTION

The present invention relates to UV-curable coating compositions containing

A) 20 to 75 wt %, based on the total weight of components A), B) and C), of a reaction product, which is essentially free from hydroxyl and isocyanate groups and is prepared from A1) one or more hydroxyalkyl acrylates having 2 to 4 carbon atoms in the alkyl group, optionally mixed with up to 30 hydroxyl equivalent %, based on the total weight of component A1), of other alcohols, and A2) an polyisocyanate component containing an aliphatic polyisocyanate which contains isocyanurate groups, is based on 1,6-diisocyanatohexane and has an NCO content of 22 to 23.5 wt % and a viscosity at 23° C. of 800 to 1400 mPa.s, B) 5 to 80 wt %, based on the total weight of components A), B) and C), of a low-viscosity acrylic ester component containing B1) at least 80 wt % of one or more bis-acrylates having a molecular weight below 350 and based on an alkanediol which may contain ether oxygen atoms and B2) up to 20 wt %, based on the weight of component B), of one or more acrylic esters other than B1), C) 0 to 80 wt %, based on total weight of components A), B) and C), of a solvent or solvent mixture and D) 0.1 to 10 wt %, based on the total weight of components A), B) and C), of one or more photoinitiators.

The present invention is also directed to the use of the coating compositions for coating molded articles of thermoplastic polycarbonates.

DETAILED DESCRIPTION OF THE INVENTION

The coating compositions to be used according to the invention preferably contain 25 to 60 wt % of component A), 10 to 75 wt % of component B) and 10 to 75 wt % of component C),. wherein these percentages are based on the total weight of components A), B) and C). The content of initiator component D) is preferably 1 to 5 wt %, based on the total weight of components A), B) and C).

Component A) is selected from reaction products of at least 70% by weight of component A1) and optionally up to 30% by weight of component A2), wherein these percentages are based on the weight of component A). Component A) is "essentially free from hydroxyl and isocyanate groups" which means that in the production of the reaction products, components A1) and A2) are used at an NCO/OH equivalent ratio of 0.9:1 to 1.1:1, preferably about 1:1.

Starting compounds A1) are hydroxyalkyl acrylates with 2 to 4 carbon atoms in the hydroxyalkyl group or, less preferably, mixtures of such hydroxalkyl acrylates with other compounds having alcoholic hydroxyl groups. Suitable hydroxyalkyl acrylates include 2-hydroxyethyl acrylate, the isomer mixture formed by the addition of propylene oxide to acrylic acid, or 4-hydroxybutyl acrylate. 2-hydroxyethyl acrylate is preferred.

Other suitable hydroxyl compounds include mono- to trihydric aliphatic alcohols having molecular weights of 32 to 400, such as methanol, ethanol, n-hexanol, isooctanol, isododecanol, benzyl alcohol, ethylene glycol, diethylene glycol, propylene glycol, glycerol and alcohols obtained from these alcohols by alkoxylation.

Component A2) is selected from polyisocyanates having isocyanurate groups, which are based on 1,6-diisocyanatohexane (hexamethylene diisocyanate, HDI) and have an NCO content of 22 to 23.5 wt % and a viscosity at 23° C. of 800 to 1400 mPa.s. These polyisocyanates are obtained in a known manner by the trimerizing HDI until the reaction mixture has an NCO content of 42 to 45, preferably 42.5 to 44.5 wt %, subsequently terminating the reaction and removing unreacted HDI by distillation to a residual content of less than 0.5 wt %.

The manufacture of component A) by reacting starting components A1) and A2) can be carried out by known methods, optionally by using suitable urethane catalysts. As previously indicated, the reaction is carried out at an NCO/OH equivalent ratio of 0.9:1 to 1.1:1, preferably about 1:1.

Suitable catalysts for this reaction include tin(II) octanoate, dibutyltin dilaurate and tertiary amines such as dimethylbenzylamine. The reaction can be carried out in the absence of the other components or also in the presence of reactive diluent component B) and/or solvent component C), provided that these components do not contain H atoms reactive with isocyanate groups, i.e., isocyanate-reactive groups.

Urethane acrylate A) can be protected from premature and undesirable polymerization before the manufacture of the coating compositions according to the invention by the addition of suitable inhibitors and antioxidants, such as phenols and/or hydroquinones, in amounts of 0.001 to 0.3 wt % each, based on the weight of the urethane acrylate. A very suitable inhibitor is phenothiazine, which is used in the examples. This inhibitor can be added before, during and/or following the reaction of components A1) and A2).

Component B) is selected from bis-acrylates of alkanediols, optionally containing ether oxygen atoms, provided that the bis-acrylates have a molecular weight of less than 350. These bis-acrylates may be mixed with up to 20 wt %, based on the total weight of component B), of other acrylic esters of tri- to hexafunctional alcohols. Suitable bis-acrylates include dipropylene glycol diacrylate, tripropylene glycol diacrylate, 1,4-butanediol diacrylate and 1,6-hexanediol diacrylate.

Suitable acrylic esters of higher alcohols include trimethylolpropane triacrylate, pentaerythritol tetraacrylate or sorbitol hexaacrylate. Component B) preferably exclusively contains 1,6-hexanediol diacrylate.

Suitable solvents C) include $C_5$–$C_8$ aliphatic compounds or cyclo-aliphatic compounds, fluorinated/chlorinated hydrocarbons, $C_1$–$C_6$ aliphatic or cycloaliphatic alcohols and solvent systems containing a) 50 to 95 wt % of $C_1$–$C_8$ aliphatic alcohols, such as methanol, ethanol, propanol, i-propanol, n-butanol, and i-butanol, and b) 5 to 50 wt % of aliphatic esters, such as ethyl acetate or butyl acetate.

Photoinitiators D) are known and include those described in "Methoden der organischen Chemie" (Houben-Weyl), Volume E 20, pages 80 ff, Georg Thieme Verlag, Stuttgart 1987. Preferred are benzoin ethers such as benzoin isopropyl ether, benzil ketals such as benzil dimethylketal, and hydroxyalkylphenones such as 2-hydroxy-2-methyl-1-phenyl-1-propan-1-one.

The coating compositions according to the invention can be mixed with known additives E) such as UV absorbers, fillers, pigments, dyes, thixotroping agents, smoothing agents, flatting agents and levelling agents, which can be used in the customary amounts.

Components A), B), C), D) and E) can be mixed by customary methods, e.g., at room temperature or slightly elevated temperatures, preferably with exclusion of the direct action of light.

The polycarbonate articles can be coated with the coating compositions according to the invention by known methods such as by spraying and dipping processes.

The curing of the coatings is initiated by UV-irradiation, for which purpose commercial UV radiation sources are preferably used.

Thermoplastic polycarbonates, their manufacture and their use for the manufacture of molded articles are described for example in "Chemistry and Physics of Polycarbonates", Polymer Rev. Vol. 9, Interscience Publishers.

Examples of molded articles of thermoplastic polycarbonates which can be coated according to the invention are all types of articles of daily use, wherein abrasion and scratch resistance as well as stability to weathering are required to a particular degree. Examples include electrical articles, cover plates, sight screens, safety discs and solid slabs.

In the following examples all parts and percentages are percentages by weight, unless otherwise indicated.

EXAMPLES

The following polyisocyanates are used in Table 1:

Polyisocyanate 1

A polyisocyanate prepared by trimerizing hexamethylene diisocyanate at 60 to 65° C. using trimethylbenzylammonium hydroxide as the catalyst, terminating the trimerization reaction with dibutyl phosphate at an NCO content of 43.6 to 44% and removing excess hexamethylene diisocyanate in the short-path evaporator to a residual content of <0.5%.

NCO content: 23%

Viscosity: 1000 mPa.s (23° C.)

Polyisocyanate 2—Polyisocyanate from mixture M1 of DE-OS 4,021,109

An HDI-based biuret polyisocyanate available form Bayer AG as Desmodur N 3200.

NCO content: 23%

Viscosity: 3100 mPa.s (23° C.)

Polyisocyanate 3—Polylsocyanate from mixture M2 of DE-OS 4,021,109

An HDI-based, isocyanurate group-containing polyisocyanate available from Bayer AG as Desmodur N 3300.

NCO content: 22%

Viscosity: 3100 mPa.s (25° C.)

Preparation of urethane acrylates (Component A)

The polyisocyanates set forth in Table 1 were dissolved in 1,6-hexanediol diacrylate. After the addition of 0.02% of dibutyltin dilaurate and 0.01% of phenothiazine, based on the total weight of polyisocyanate and 2-hydroxyethyl acrylate, 2-hydroxyethyl acrylate was added while passing through dry air at 50 to 60° C. The temperature was maintained until the NCO content had fallen below 0.1%.

TABLE 1

Solutions of urethane acrylates A) in acrylic ester B)

| Starting components (%) | Solution 1 | Solution 2 (Comp) | Solution 3 (Comp) |
|---|---|---|---|
| Polyisocyanate 1 (A2) | 46.0 | — | — |
| Polyisocyanate 2 | — | 46.0 | — |
| Polyisocyanate 3 | — | — | 47.1 |
| 2-Hydroxyethyl acrylate (A1) | 29.0 | 29.0 | 27.9 |
| 1,6-Hexanediol diacrylate (B) | 25.0 | 25.0 | 25.0 |
| Viscosity (mPa · s)/23° C.) | 4500 | 6500 | 8700 |

The solutions of urethane acrylates according to Table 1 were processed to spraying lacquers according to the formulation given in Table 2 and sprayed in one operation at 20 g/m² on plates (145×65×3 mm) of bisphenol A homopolycarbonate (Makrolon AL 2443, Bayer AG). After a flash-off time of 3 minutes at room temperature the coatings were cured by means of a UV irradiation plant available from IST (1 mercury high-pressure UV radiation source, 80 W/cm, 1 m/min belt speed).

To determine the scratch resistance, the increase in haziness after spraying the sample with quartz sand was measured according to DIN 52348.

The weathering resistance was tested by means of accelerated weathering tests (DIN 53231, Xenotest 1200).

To evaluate the adhesion of the coating and its weathering resistance, a cross-cut test was carried out by scratching a grid of 6 by 6 lines, each at a distance of 1 mm, in the coating, followed by pressing on and rapidly peeling off an adhesive tape.

The test results of the coatings are set forth in Table 3.

TABLE 2

| Coating Composition (%) | Example 1 | Comparative Example 2 | Comparative Example 3 |
|---|---|---|---|
| Solution 1 | 36.0 | | |
| Solution 2 | | 36.0 | |
| Solution 3 | | | 36.0 |
| 1,6-Hexanediol diacrylate (B) | 34.9 | 34.9 | 34.9 |
| Solvent Mixture* (C) | 25.0 | 25.0 | 25.0 |
| 2-Hydroxy-2-methyl-1-phenyl-1-propane-1-one (photoinitiator) | 2.0 | 2.0 | 2.0 |
| Light protective agent** | 1.4 | 1.4 | 1.4 |
| Light protective agent*** | 0.7 | 0.7 | 0.7 |

*A solvent mixture containing 27.3% ethanol, 36.3% isopropanol, 27.3% ethyl acetate and 9.1% n-butanol.
**Tinuvin 350, available from Ciba-Geigy.
***Tinuvin 292, available from Ciba-Geigy.

TABLE 3

| | Example 1 | Comparative Example 2 | Comparative Example 3 |
|---|---|---|---|
| Scratch Resistance | good | good | good |
| Loss of adhesion after weathering (hours) | >3000 | <1500 | <1500 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A molded article of thermoplastic polycarbonate coated with an UV-curable coating composition containing A) 20 to 75 wt %, based on the total weight of components A), B) and C), of a reaction product, which is essentially free from hydroxyl and isocyanate groups and is prepared from
  A1) one or more hydroxyalkyl acrylates having 2 to 4 carbon atoms in the alkyl group, optionally mixed with up to 30 hydroxyl equivalent %, based on the total weight of component A1), of one or more other alcohols, and
  A2) an polyisocyanate component comprising an aliphatic polyisocyanate which contains isocyanurate groups, is based on 1,6-diisocyanatohexane and has an NCO content of 22 to 23.5 wt % and a viscosity at 23° C. of 800 to 1400 mPa.s, B) 5 to 80 wt %, based on the total weight of components A), B) and C), of a low-viscosity acrylic ester component containing
  B1) at least 80 wt % of one or more bis-acrylates having a molecular weight of less than 350 and based on an alkane diol which may contain ether oxygen atoms and
  B2) up to 20 wt %, based on the weight of component B), of one or more acrylic esters other than B1), C) 0 to 80 wt %, based on total weight of components A), B) and C), of a solvent or solvent mixture and D) 0.1 to 10 wt %, based on the total weight of components A), B) and C), of one or more photoinitiators.

2. The molded article of claim 1 wherein component A1) exclusively contains 2-hydroxyethyl acrylate.

3. The molded article of claim 1 wherein component A2) exclusively contains said aliphatic polyisocyanate.

4. The molded article of claim 2 wherein component A2) exclusively contains said aliphatic polyisocyanate.

* * * * *